(12) United States Patent
Hawk, III et al.

(10) Patent No.: US 8,701,691 B2
(45) Date of Patent: Apr. 22, 2014

(54) LAYOUT HUNTING BLIND

(75) Inventors: James V. Hawk, III, McClelland, IA (US); Tyson J. Keller, Pierre, SD (US)

(73) Assignee: Maxx Outdoors, LLC, Council Bluffs, IA (US)

( * ) Notice: Subject to any disclaimer, the term of this patent is extended or adjusted under 35 U.S.C. 154(b) by 293 days.

(21) Appl. No.: 13/324,385

(22) Filed: Dec. 13, 2011

(65) Prior Publication Data
US 2013/0146113 A1 Jun. 13, 2013

(51) Int. Cl.
*E04H 15/48* (2006.01)
(52) U.S. Cl.
USPC .................................. 135/143; 135/901; 43/1
(58) Field of Classification Search
USPC ................. 135/901, 143, 151, 153, 155; 43/1
See application file for complete search history.

(56) References Cited

U.S. PATENT DOCUMENTS

| | | | |
|---|---|---|---|
| 4,751,936 A | 6/1988 | Zibble et al. | |
| 5,647,159 A * | 7/1997 | Latschaw | 43/1 |
| 5,822,906 A * | 10/1998 | Ward | 43/1 |
| D405,890 S | 2/1999 | Latschaw | |
| 5,906,217 A * | 5/1999 | Hill | 135/124 |
| 6,016,823 A * | 1/2000 | Hill | 135/124 |
| 6,694,995 B1 | 2/2004 | Ransom | |
| 6,698,131 B2 | 3/2004 | Latschaw | |
| 7,237,283 B2 | 7/2007 | Devries | |
| 7,549,434 B2 * | 6/2009 | Bean | 135/143 |
| 8,342,197 B2 * | 1/2013 | Roman et al. | 135/125 |
| 8,381,750 B2 * | 2/2013 | Desouches et al. | 135/115 |
| 2007/0221261 A1 * | 9/2007 | Bean | 135/143 |
| 2013/0291916 A1 * | 11/2013 | Parsons | 135/117 |

* cited by examiner

*Primary Examiner* — David R Dunn
*Assistant Examiner* — Danielle Jackson
(74) *Attorney, Agent, or Firm* — Dennis L. Thomte; Thomte Patent Law Office LLC (57) ABSTRACT

A portable and collapsible multi-person layout hunting blind. The blind includes a head end, a foot end, a first side and a second side. A pivotal foot panel is movably mounted on the blind at the foot end of the blind. First and second pivotal side doors are provided at the head end of the blind. The blind has a width sufficient so that at least two, and perhaps more, hunters may position themselves in the blind.

11 Claims, 9 Drawing Sheets

LAYOUT HUNTING BLIND

BACKGROUND OF THE INVENTION

1. Field of the Invention

This invention relates to a layout hunting blind and more particularly to a layout hunting blind which will accommodate at least two hunters therein.

2. Description of the Related Art

Waterfowl hunters position themselves in hunting blinds to conceal themselves from the waterfowl. Waterfowl have excellent eye sight and will not land in an area where they spot anything unusual or threatening. There are two common types of blinds for land and field-based waterfowl hunting: pit blinds and layout blinds. Layout blinds allow a hunter to have a low profile in a field without digging a hole. Many layout blinds are made of an aluminum metal frame and a canvas cover. Some commercial layout blinds are fitted with spring-loaded flaps on top that retract when the hunter is ready to fire. A layout blind allows a hunter to lie prone in the blind with only the head or face exposed to allow good visibility. Newer blinds also have a screen that provides a one-way view outside the blind to conceal the hunter but will allow him/her to observe the waterfowl. When birds are in range the hunter can open the flaps and quickly sit up to a shooting position.

To the best of Applicants' knowledge, all the prior art layout hunting blinds are adapted to accommodate a single hunter. If a hunter wishes to take his/her daughter or son hunting, the hunter is required to utilize two separate layout blinds which makes it difficult for the hunter to communicate and instruct his/her daughter or son in hunting techniques and safety matters. For example, if a hunter and his/her daughter or son are positioned in spaced-apart layout blinds the father/mother will not be able to constantly check to make certain that the child's shotgun is in the "safe" position, and that the child will shoot in the proper quadrant.

SUMMARY OF THE INVENTION

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

A layout hunting blind is disclosed which will accommodate at least two hunters therein and which includes an upstanding, generally rectangular frame means having upper and lower ends. The frame means includes:

(a) an elongated head frame portion having a first end, a second end, a lower end, an upper end, an inner side and an outer side;

(b) an elongated first side frame portion having a head end, a foot end, a lower end, an upper end, an inner side and an outer side;

(c) the head end of the first side frame portion being secured to the first end of the head frame portion;

(d) an elongated second side frame portion having a head end, a foot end, a lower end, an upper end, an inner side and an outer side;

(e) the head end of the second frame portion being secured to the second end of the head frame portion;

(f) an elongated foot frame portion spaced from the head frame portion and having a first end, a second end, a lower end, an upper end, an inner side and an outer side;

(g) the first end of the foot frame portion being secured to the foot end of the first side frame portion;

(h) the second end of the foot frame portion being secured to the foot end of the second side frame portion.

A flexible bottom sheet member extends between the lower ends of the head frame portion, the foot frame portion, the first side frame portion and the second side frame portion. A flexible head sheet member at least partially covers the outer side of the head frame portion and a flexible foot sheet member covers the outer side of the foot frame portion. A flexible first side sheet member covers the outer side of the first side frame portion and a flexible second side sheet member covers the outer side of the second frame portion.

The frame means of the blind also includes a foot panel support frame having a first end, a second end, a first side, a second side, an inner surface and an outer surface. The second end of the foot panel support frame is operatively pivotally secured to the upper end of the foot frame portion so that the foot panel support frame may be selectively moved between open and closed positions. The foot panel support frame is positioned on and extends between the upper ends of the first and second side frame portions when in its closed position. The first end of the foot panel support frame is spaced from the head frame portion when the foot panel support frame is in its closed position to provide a shooting opening for the hunters within the blind when the foot panel support frame is in its closed position. The outer side of the foot panel support frame has a foot panel sheet member extending thereover so that the foot panel support frame and the foot panel sheet member form a foot panel.

A first side door support frame is also provided which has a first end, a second end, an outer side edge portion, an inner side edge portion, an inner surface and an outer surface. The outer side edge portion of the first side door frame is operatively movably secured to the upper end of the first side frame portion so as to be movable between open and closed positions. The inner side edge portion of the first side door support frame is supported upon the door support to partially close the shooting opening when the foot panel support frame is in its closed position and the first side door support frame is in its closed position. A first side door sheet member extends over the outer side of the first side door support frame with the first side door frame and first side door sheet member forming a first side door. A second side door support frame is also provided having a first end, a second end, an outer side edge portion, an inner side edge portion, an inner surface and an outer surface. The outer side edge portion of the second side door support frame is operatively movably secured to the upper end of the second side frame portion so as to be movable between open and closed positions. The inner side edge portion of the second side door support frame is supported upon the door support to partially close the shooting opening when the foot panel support frame is in its closed position and the second side door support frame is in its closed position. A second side door sheet member extends over the outer side of the second side door support frame with the second side door support frame and the second side door sheet member forming a second side door. The first and second side doors close the shooting opening when in their closed positions. The distance between the first and second side frame portions is sufficient so that the blind will accommodate a plurality of hunters.

In the preferred embodiment, each of the first and second side door sheet members has a portion thereof adjacent the first end thereof which is comprised of a see-through material. In the preferred embodiment, the upper ends of the head frame portion of the frame means includes first and second recessed portions formed therein. In the preferred embodiment, a first inclined head and back rest, having upper and lower ends, is positioned inwardly of the inner side of the head frame portion with the upper end thereof being positioned adjacent the first recessed portion. A second inclined head and back rest, having upper and lower ends, is positioned inwardly of the inner side of the head frame portion with the upper end thereof being positioned adjacent the second recessed portion of the head frame portion. Preferably, the outer sides of the head frame sheet member, foot frame sheet member, first side door sheet member, second side door sheet member, foot panel sheet member, first side door sheet member and second side door sheet member have camouflaging designs thereon.

It is therefore a principal object of the invention to provide a layout hunting blind which will accommodate at least two hunters therein.

A further object of the invention is to provide a layout hunting blind which is portable and collapsible.

A further object of the invention is to provide a layout hunting blind which is easily assembled and disassembled.

A further object of the invention is to provide a layout hunting blind which is comfortable.

A further object of the invention is to provide a multiple-person layout hunting blind which is easily movable between a hunter concealment position to an open shooting position.

These and other objects will be apparent to those skilled in the art.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DESCRIPTION OF THE PREFERRED EMBODIMENT

Embodiments are described more fully below with reference to the accompanying figures, which form a part hereof and show, by way of illustration, specific exemplary embodiments. These embodiments are disclosed in sufficient detail to enable those skilled in the art to practice the invention. However, embodiments may be implemented in many different forms and should not be construed as being limited to the embodiments set forth herein. The following detailed description is, therefore, not to be taken in a limiting sense in that the scope of the present invention is defined only by the appended claims.

In the drawings, the numeral 10 refers to the layout hunting blind of this invention. Although the blind 10 shown in the drawings is designed to accommodate two hunters therein, the blind may be enlarged so as to accommodate three or more hunters therein. Blind 10 includes a portable, selectively collapsible frame means 12. Frame means 12 is generally rectangular in configuration and may be constructed of metal or plastic. Frame means 12 includes a horizontally disposed base frame 14. Base frame 14 includes a head frame 16 having a first end 18 and a second end 20. Head frame 16 may be of single piece construction or constructed of a plurality of frame sections selectively secured together in an end-to-end manner. Base frame 14 also includes a first side frame 22 having a head end 24 and a foot end 26. Side frame 22 may be of single-piece construction or constructed of a plurality of frame sections selectively secured together in an end-to-end manner. The head end 24 of side frame 22 is secured to the end 18 of head frame 16.

Base frame 14 also includes a second side frame 28 having a head end 30 and a foot end 32. Side frame 28 may be of single-piece construction or constructed of a plurality of frame sections selectively secured together in an end-to-end manner. The head end 30 of side frame 28 is secured to end 20 of head frame 16. Base frame 14 further includes a foot frame 34 having a first end 36 and a second end 38. Foot frame 34 may be of single-piece construction or constructed of a plurality of frame sections selectively secured together in an end-to-end manner. End 36 of foot frame 34 is secured to end 26 of side frame 22. End 38 of foot frame 34 is secured to end 32 of side frame 28.

Frame means 12 also includes a generally horizontally disposed upper frame 40. Upper frame 40 includes a head frame 42 having a first end 44 and a second end 46. Head frame 42 includes a pair of spaced-apart recessed portions 48 and 50 formed therein. Head frame 42 may be of single-piece construction or constructed of a plurality of frame sections selectively joined together.

Upper frame 40 also includes a first side frame 52 having a head end 54 and a foot end 56. Side frame 52 may be of single-piece construction or constructed of a plurality of frame sections selectively joined together. The head end 54 of side frame 52 is secured to end 44 of head frame 42. Upper frame 40 further includes a second side frame 58 having a head end 60 and a foot end 62. Side frame 58 may be of single-piece construction or constructed of a plurality of frame sections selectively joined together. The head end 60 of side frame 58 is secured to end 46 of head frame 42.

Upper frame 40 further includes a foot frame 64 having ends 66 and 68. Foot frame 64 may be of single-piece construction or constructed of a plurality of frame sections selectively secured together. End 66 of foot frame 64 is secured to foot end 56 of side frame 40. End 68 of foot frame 64 is secured to foot end 62 of side frame 58.

Support members 70, 72, 74 and 75 have their lower ends secured to head frame 16 of base frame 14 and have their upper ends secured to head frame 42 of upper frame 40. A diagonally extending support member 76 has its lower end secured to side frame 22 and has its upper end secured to the head end 54 of side frame 52. A detachable brace 78 has its lower end secured to side frame 22 and has its upper end secured to support member 76.

A diagonally extending support member 80 has its lower end secured to side frame 28 and has its upper end secured to the head end 60 of side frame 58. A detachable brace 82 has its lower end secured to side frame 28 and has its upper end secured to support member 80. It should be noted that supports 76 and 80 could be integrally formed with head frame 42.

Figure 1:
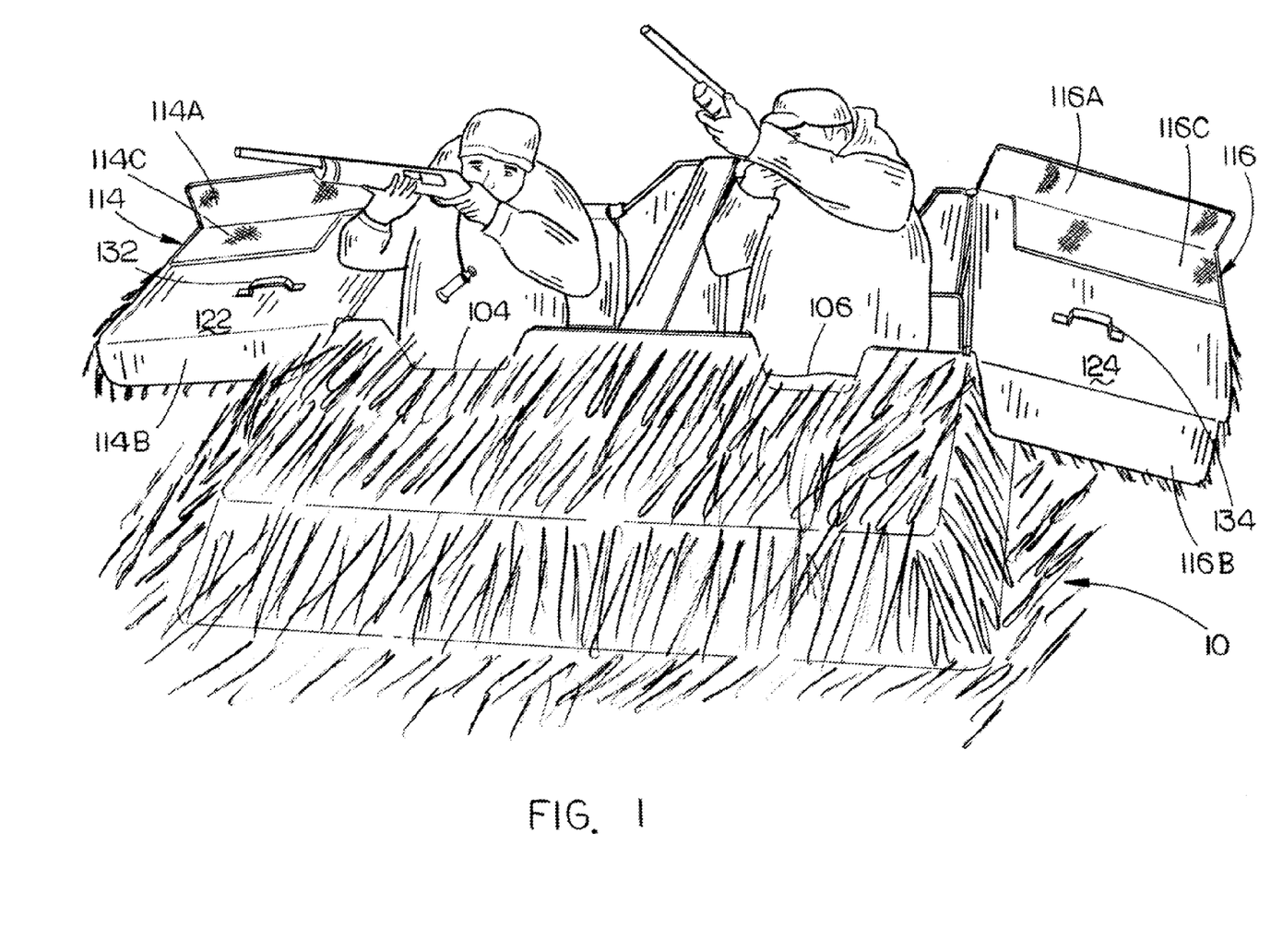
FIG. 1 is a front perspective view of the blind of this invention used by a pair of hunters.
Figure 2:
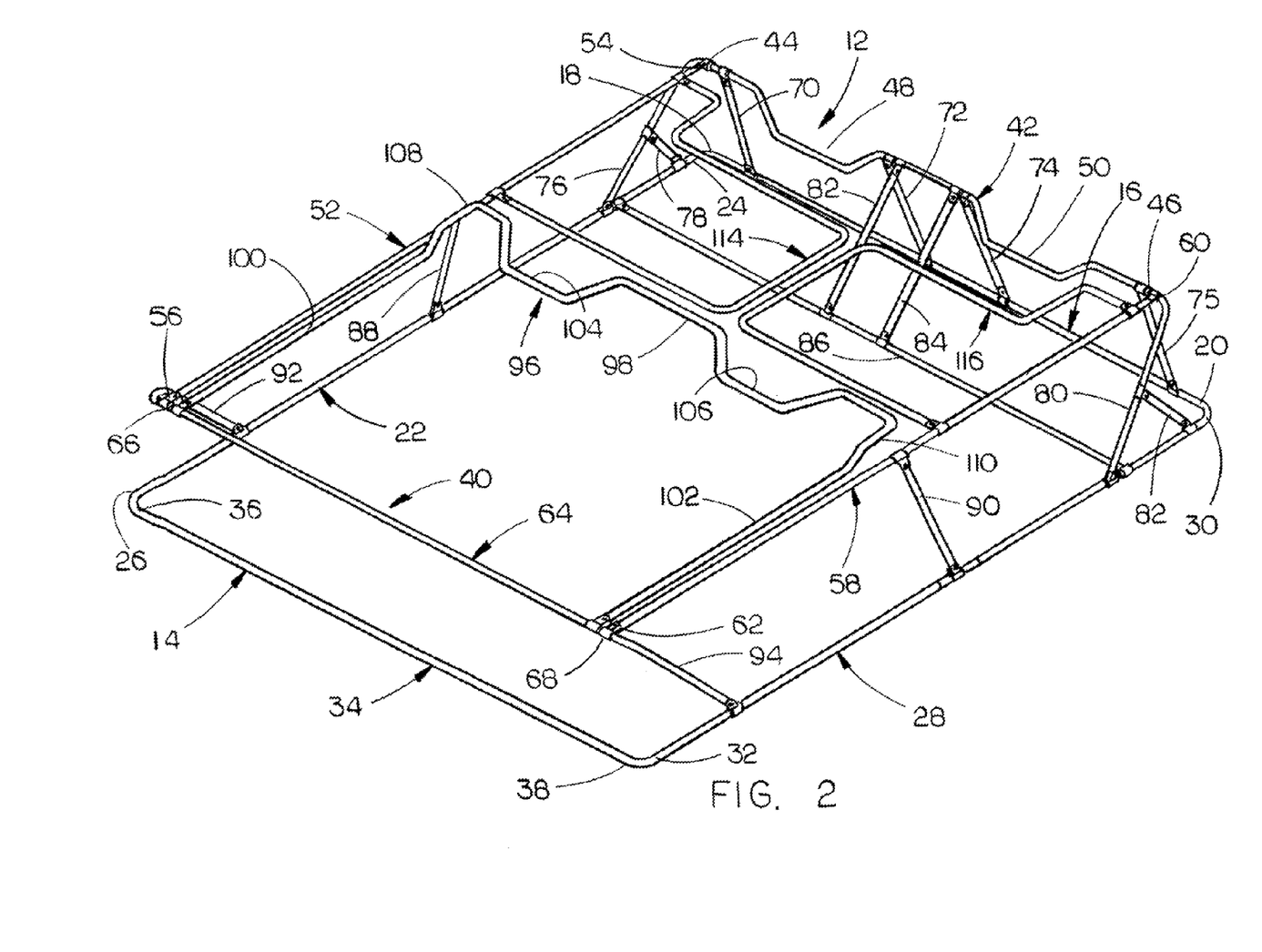
FIG. 2 is a perspective view of the frame means of the hunting blind of this invention.

A pair of supports 82 and 84 have their upper ends secured to head frame 42 and have their lower ends secured to a cross-member 86 which extends between side frame 22 and side frame 28 as seen in FIG. 2. Support 88 has its upper end secured to side frame 52 and has its lower end secured to side frame 22. Support 90 has its upper end secured to side frame 58 and has its lower end secured to side frame 28. Support 92 has its upper end secured to end 66 of foot frame 64 and has its lower end secured to side frame 22. Support 92 may be a separate piece or may simply be an extension of foot frame 64. Support 94 has its upper end secured to foot frame 64 and has its lower end secured to side frame 28. Support 94 may be a separate piece or may simply be an extension of foot frame 64.

Figure 3:
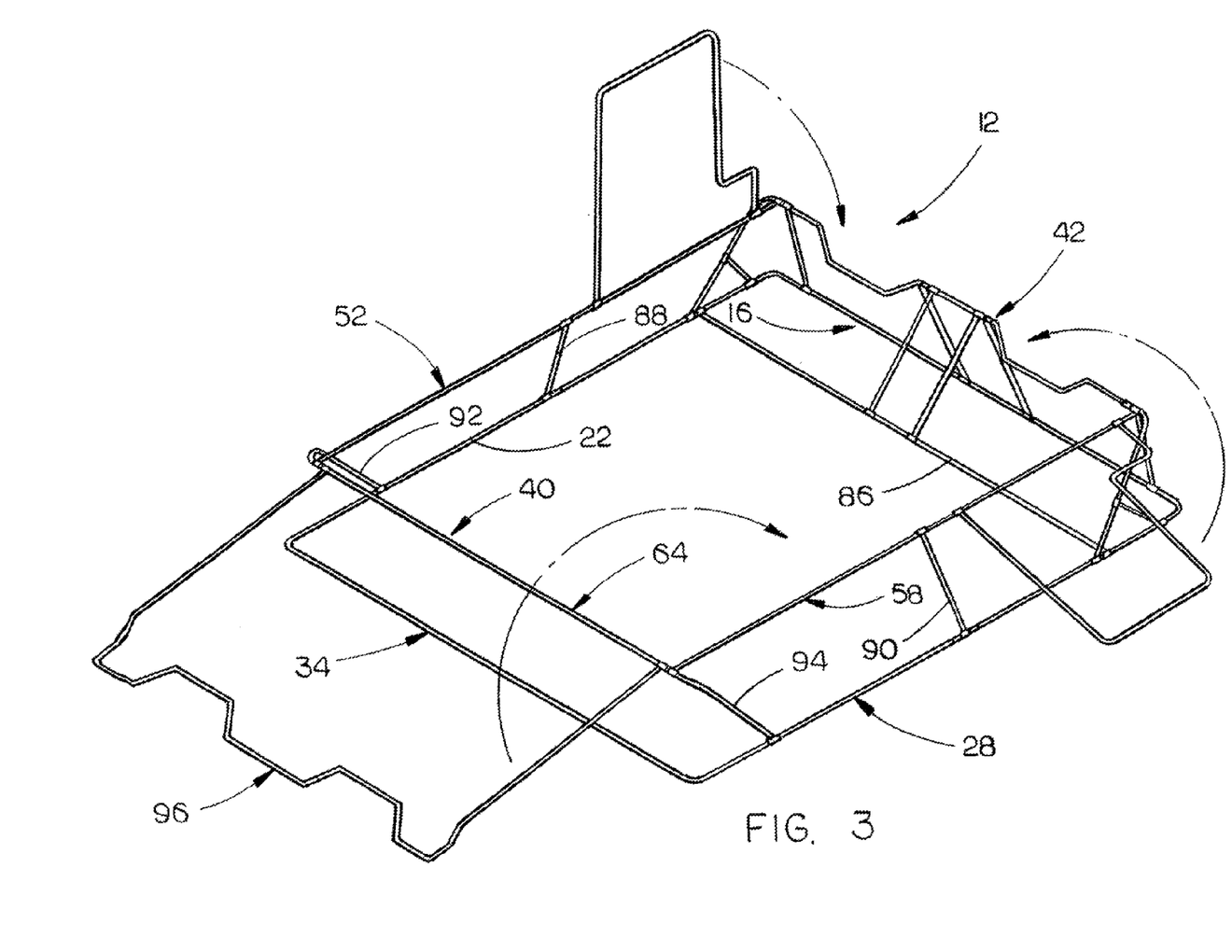
FIG. 3 is a perspective view similar to FIG. 2 except that the panel and side doors have been pivotally moved towards their open positions.
Figure 4:
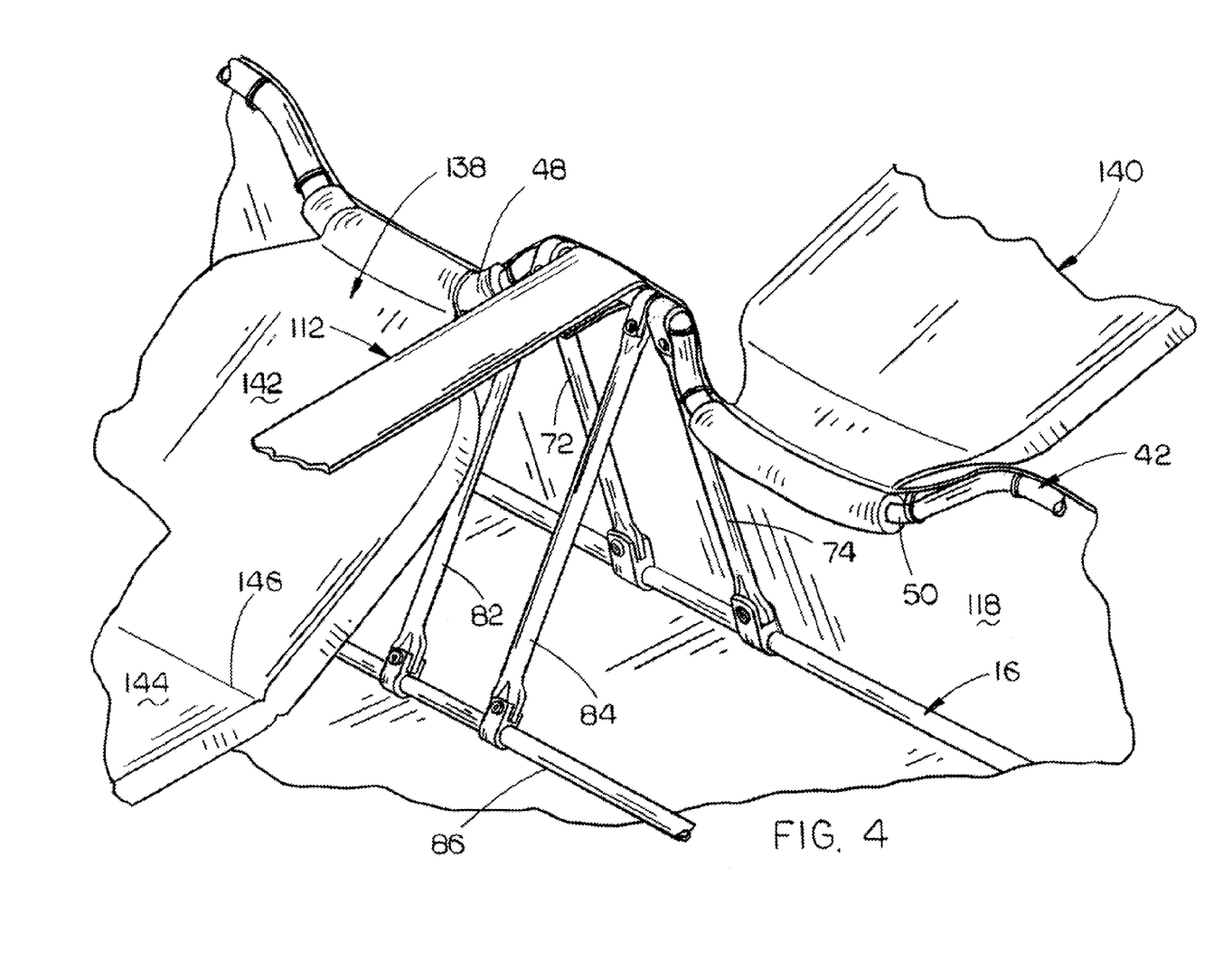
FIG. 4 is a partial perspective view of the head frame portion of this invention and the head and back rests attached thereto.
Figure 5:
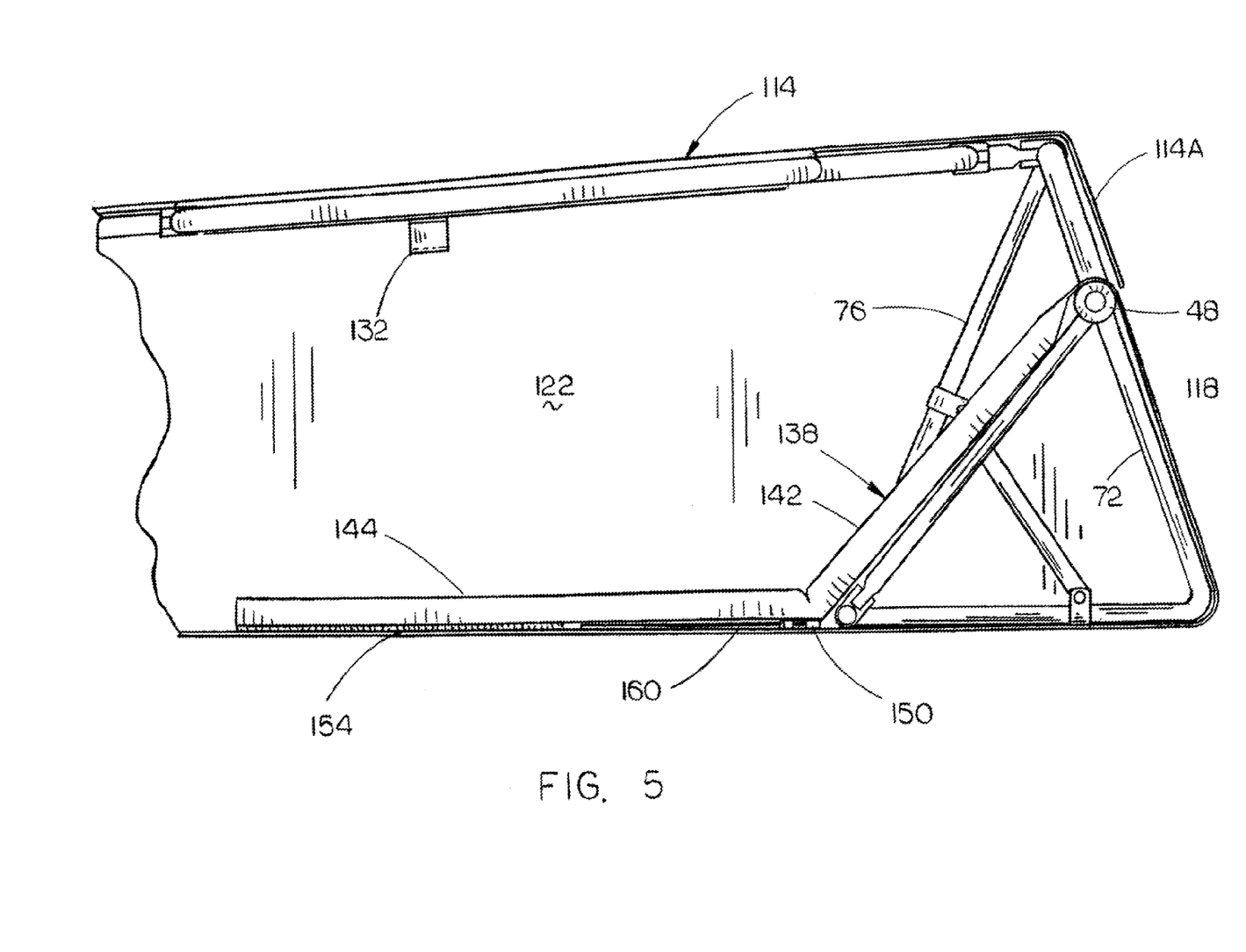
FIG. 5 is a partial sectional view of the head end of the blind of this invention.
Figure 7:
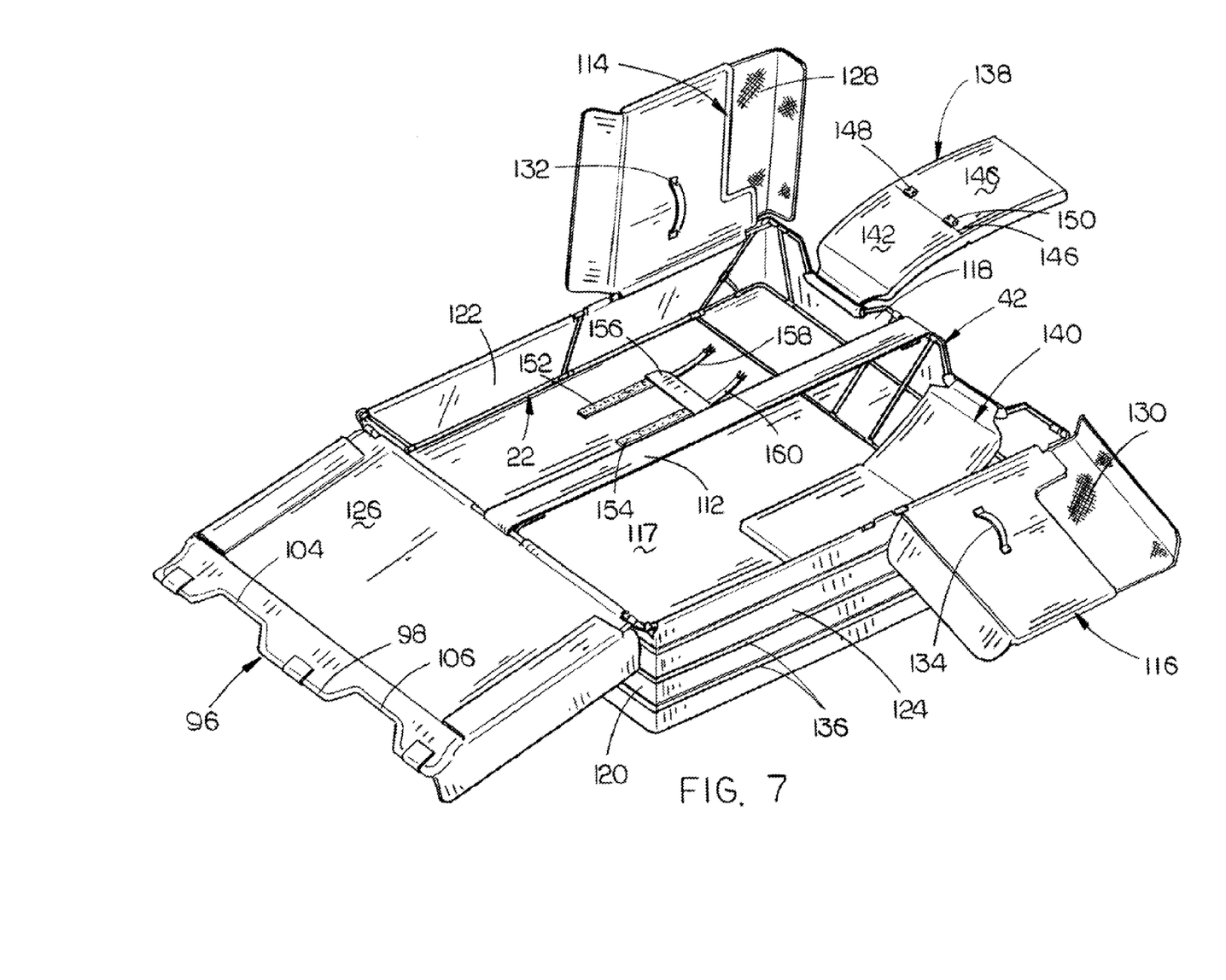
FIG. 7 is a perspective view of the blind of this invention with the foot panel thereof in its open position and the side doors being open or moved towards their open position.
Figure 8:
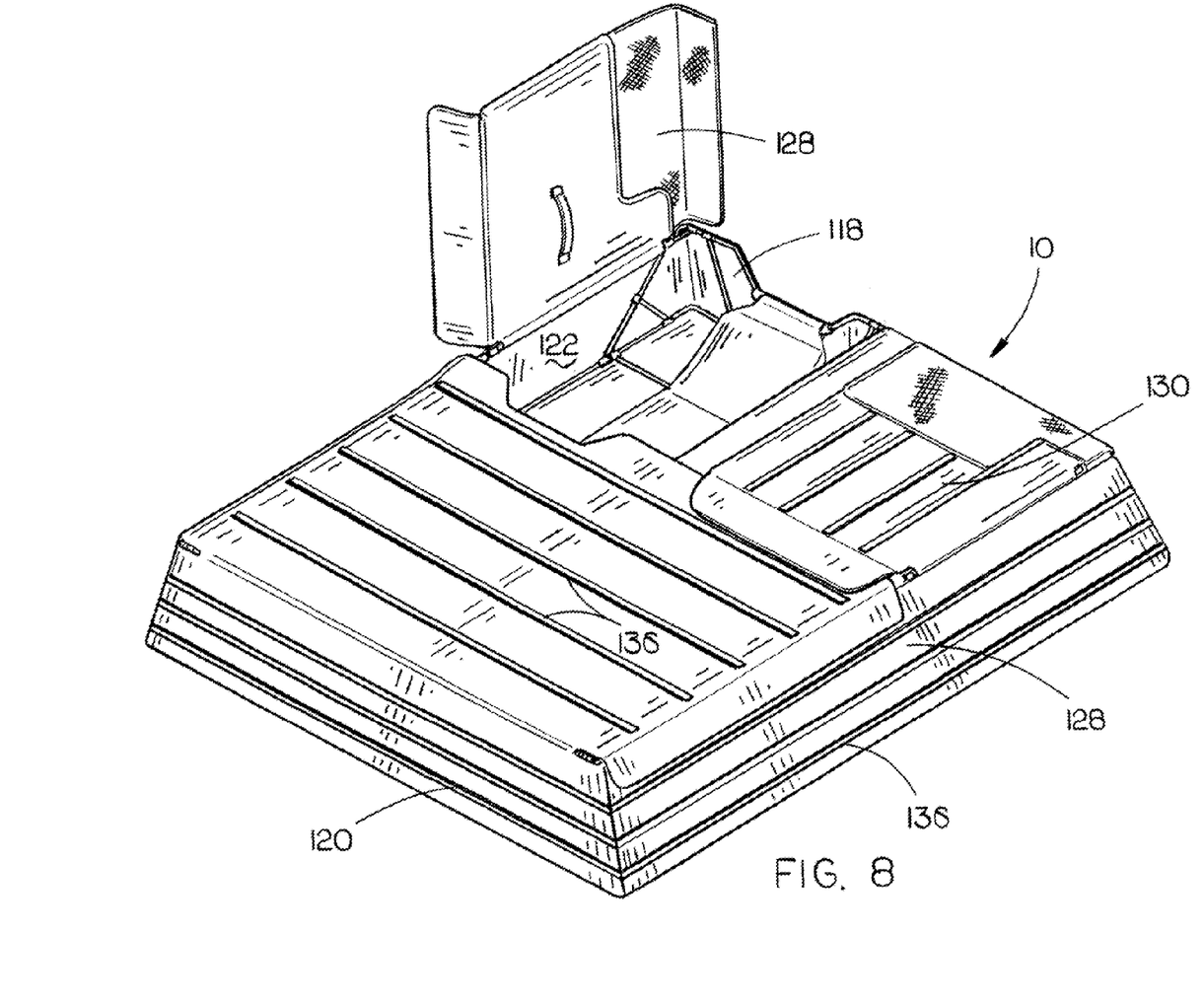
FIG. 8 is a perspective view of the blind which illustrates the first side door being moved towards its open position.

Frame means 12 also includes a generally U-shaped foot panel frame 96 which includes an end portion 98 having legs 100 and 102 extending therefrom. Legs 100 and 102 are pivotally secured to foot frame 64 so as to be movable between the closed position of FIG. 2 to the open position of FIG. 3. End portion 98 of foot panel frame 96 has a pair of gun rest recessed portions 104 and 106. Legs 100 and 102 are provided with laterally extending portions 108 and 110 respectively which rest upon side frames 52 and 58 of upper frame 40 when the side panel frame 96 is in the closed position A flexible support strap 112 has its head end secured to head frame 42 as seen in FIG. 4 and has its foot end secured to foot frame 64 as seen in FIG. 7.

For purposes of description, the head frame 16 of base frame 14 and head frame 42 of upper frame 40 define a head frame portion of the frame means 12. The first side frames 22 and 52 of base frame 14 and upper frame 40 define a first side portion of the frame means 12. The second side frames 28 and 58 of base frame 14 and upper frame 40 define a second side portion of the frame means. The foot frames 34 and 64 of base frame 14 and upper frame 40 define a foot frame portion of frame means 12.

Frame means 12 also includes a first side door support frame 114 which is pivotally secured to first side frame 52 of upper frame 40 at the head end thereof as seen in FIG. 2. Side door support frame 114 is pivotally movable between open and closed positions. Frame means 12 further includes a second side door support frame 116 which is pivotally secured to second side frame 58 of upper frame 40 at the head end thereof as seen in FIG. 2. Side door support frame 116 is pivotally movable between open and closed positions. When the side door support frames are in their closed positions, the inner ends thereof rest on the support strap 112.

Preferably, a flexible, waterproof bottom sheet member 117 extends between head frame 16, foot frame 34, first side frame 22 and second side frame 28. A flexible sheet member 118 covers the outer side of the head frame portion of the frame means 12. A flexible sheet member 120 covers the outer side of the foot frame portion of frame means 12. A flexible sheet member 122 covers the outer side of the first side frame portion of frame mean 12 and a flexible sheet member 124 covers the second side portion of frame means 12. Sheet member 122 includes flaps 114A and 114B and sheet member 124 includes flaps 116A and 116B. Sheet member 122 is provided with a see-through portion 114C and sheet member 124 is provided with a see-through portion 116C to enable the hunters to observe the waterfowl when the side doors are closed. Flaps 114B and 116B extend over the gun rest recessed portions 104 and 106 of the foot panel when the side doors are closed.

Preferably, the exterior surfaces of sheet members 118, 120, 122, 124, 126, 128 and 130 include camouflaging designs. Handles 132 and 134 are secured to the inner sides of sheet members 128 and 130 respectively to enable the hunters to conveniently close the side doors. Preferably, the exterior sides of the sheet members have a plurality of strips 136 provided thereon which provide pockets into which corn stalks, grass, etc. may be inserted to further camouflage the blind.

The numeral 138 refers to a first head and back rest which is movably secured to head frame 42 at recessed portion 48. A second head and back rest 140 is movably secured to head frame 42 at recessed portion 50.

Inasmuch as head and back rests 138 and 140 are identical, only head and back rest 138 will be described in detail, with "'" indicating identical structure. Head and back rest 138 includes an upper pad portion 142 which is movably secured to head frame 42 at recessed portion 48 of head frame 42. Head and back rest 138 also includes a lower pad portion 144 which is hinged to upper pad portion 142 at 146. Fasteners 148 and 150 are secured to the underside of pad portion 146, as seen in FIG. 7. Strips 152 and 154 are secured to sheet member 117, as also seen in FIG. 7, and are of the loop type. A support strip 156, having hook fasteners on the underside thereof, is longitudinally adjustably secured to strips 152 and 154 and has a pair of straps 158 and 160 secured thereto. Straps 158 and 160 have fasteners thereon which are adapted to be secured to fasteners 148 and 150 respectively in conventional fashion. The adjustable support strap 156 permits the angle of pad portion 142 to be selectively adjusted.

Figure 6:
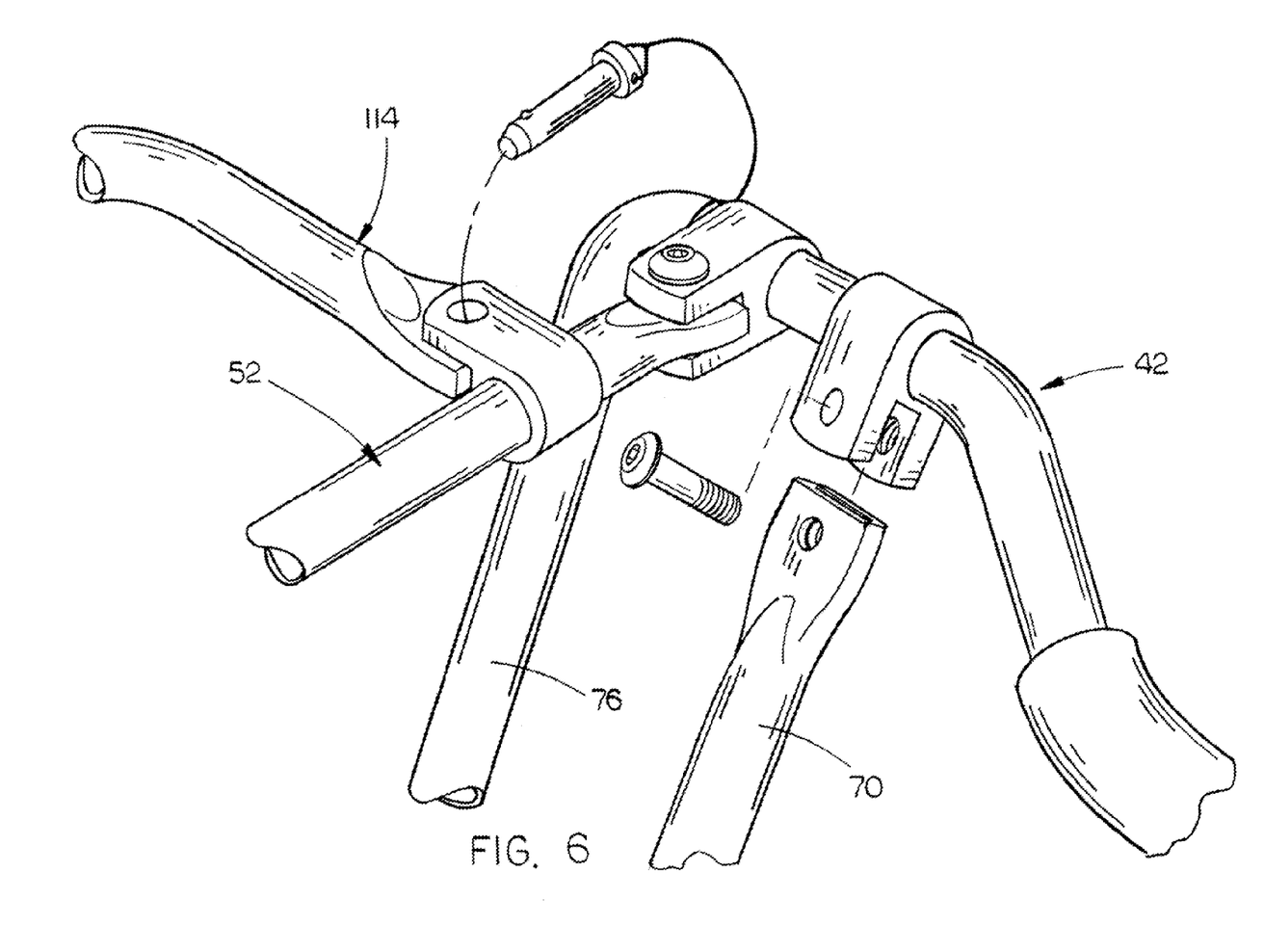
FIG. 6 is a partial exploded perspective view illustrating the manner in which certain components thereof are attached together.
Figure 9:
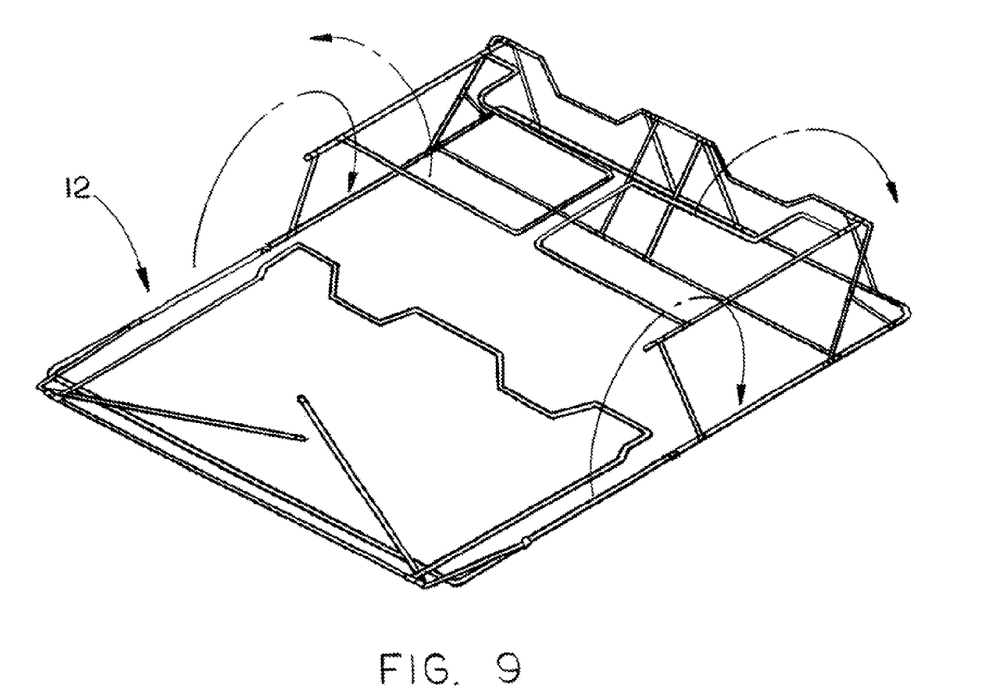
FIG. 9 is a perspective view of the frame means of this invention which illustrates the manner in which the frame means may be folded or collapsed.
Figure 10:
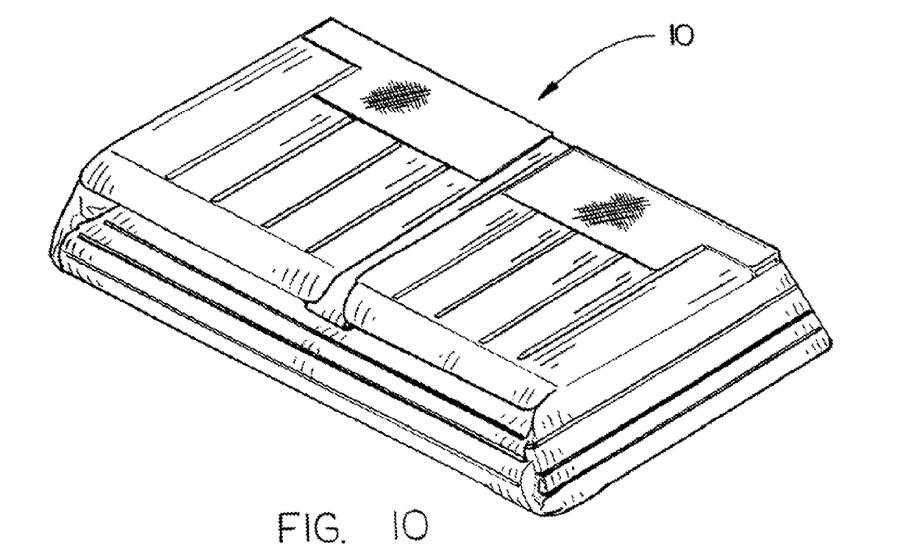
FIG. 10 is a perspective view of the blind in its folded or collapsed position.

The frame means 12 may be collapsed from the position of FIGS. 2 and 7 to the position of FIGS. 9 and 10 for transport purposes by disconnecting various support members in the manner partially illustrated in FIGS. 6 and 9.

When assembled, the side doors which are comprised of first side door frame 114 and sheet member 128 and second side door frame 116 and sheet member 130 respectively will be opened as will the foot panel which is comprised of foot panel frame 96 and sheet member 126. The hunters will enter the open blind and will normally lie down with the hunters supporting their heads and backs on the rests 138 and 140. The foot panel is then closed and the hunters will rest their shotguns in the recessed portions 104 and 106 of the foot panel frame 96.

The hunters will then close the side doors by grasping the handles. When the hunters are in the blind in a reclined position, they will be able to observe the waterfowl through the see-through portions 114C and 116C. When the waterfowl come into shooting range, they will open the side doors and will normally sit up and shoot.

Thus it can be seen that a novel multi-person hunting blind has been provided which is easily assembled or collapsed for transport. It can also be seen that the blind is convenient and comfortable to use. The fact that the blind may accommodate at least two hunters therein, and possibly more by enlarging the blind, enables the hunters within the layout blind to communicate with one another.

It can therefore be seen that the invention accomplishes at least all of its stated objectives.

Although the invention has been described in language that is specific to certain structures and methodological steps, it is to be understood that the invention defined in the appended claims is not necessarily limited to the specific structures and/or steps described. Rather, the specific aspects and steps are described as forms of implementing the claimed invention. Since many embodiments of the invention can be practiced without departing from the spirit and scope of the invention, the invention resides in the claims hereinafter appended.

We claim:

1. A multi-person layout hunting blind, comprising:
an upstanding, generally rectangular frame means;
said frame means including:
    (a) an elongated head frame portion having a first end, a second end, a lower end, an upper end, an inner side and an outer side;
    (b) an elongated first side frame portion having a head end, a foot end, a lower end, an upper end, an inner side and an outer side;
    (c) said head end of said first side frame portion being operatively interconnected to said first end of said head frame portion;
    (d) an elongated second side frame portion having a head end, a foot end, a lower end, an upper end, an inner side and an outer side;
    (e) said head end of said second side frame portion being operatively interconnected to said second end of said head frame portion;
    (f) an elongated foot frame portion spaced from said head frame portion and having a first end, a second end, a lower end, an upper end, an inner side and an outer side;
    (g) said first end of said foot frame portion being operatively interconnected to said foot end of said first side frame portion;
    (h) said second end of said foot frame portion being operatively interconnected to said foot end of said second side frame portion;
    (i) an elongated support member secured to and extending between said upper end of said head frame portion and said upper end of said foot frame portion;
a flexible bottom sheet member extending between the lower ends of said head frame portion, said foot frame portion, said first side frame portion and said second side frame portion;
a flexible head sheet member at least partially covering said outer side of said head frame portion;
a flexible foot sheet member covering said outer side of said foot frame portion;
a flexible first side sheet member covering said outer side of said first side frame portion;
a flexible second side sheet member covering said outer side of said second side frame portion;
a foot panel having a first end, a second end, a first side, a second side, an inner surface and an outer surface;
said second end of said foot panel being operatively movably secured to said upper end of said foot frame portion whereby said foot panel may be selectively moved between open and closed positions;
said foot panel being positioned on and extending between said upper ends of said first and second side frame portions when in said closed position;
said first end of said foot panel being spaced from said head frame portion when in said closed position to provide a shooting opening for the hunters within the blind when said foot panel is in said closed position;
a first side door having a first end, a second end, an outer side edge portion, an inner side edge portion, an inner surface and an outer surface;
said outer side edge portion of said first side door being operatively movably secured to said upper end of said first side frame portion so as to be movable between open and closed positions;
said inner side edge portion of said first side door being supported upon said support member to partially close the shooting opening when said foot panel is in said closed position and said first side door is in said closed position;
a second side door having a first end, a second end, an outer side edge portion, an inner side edge portion, an inner surface and an outer surface;
said outer side edge portion of said second side door being operatively movably secured to said upper end of said second side frame portion so as to be movable between open and closed positions;
said inner side edge portion of said second side door being supported upon said support member to partially close the shooting opening when said foot panel is in said closed position and said second side door is in said closed position;
said first and second side doors closing the shooting opening when in said closed positions;
the distance between said first and second side frame portions being sufficient so that the blind will accommodate a plurality of hunters therein.

2. The multi-person layout hunting blind of claim 1 wherein each of said first and second side doors have a portion thereof adjacent said first end thereof which is comprised of a see-through material.

3. The multi-person layout hunting blind of claim 1 wherein said second ends of said first and second side doors overlap said first end of said foot panel when said first and second side doors and said foot panel are in said closed position.

4. The multi-person layout hunting blind of claim 1 wherein said upper end of said head frame portion of said frame means includes first and second recessed portions.

5. The multi-person layout blind of claim 4 wherein a first head and back support, having upper and lower ends, is positioned inwardly of said inner side of said head frame portion with said upper end thereof being positioned adjacent said first recessed portion of said head frame portion and wherein a second head and back support, having upper and lower ends, is positioned inwardly of said inner side of said head frame portion with said upper end thereof being positioned adjacent said second recessed portion of said head frame portion.

6. multi-person layout blind of claim 5 wherein each of said first and second head and back supports are inclined.

7. The multi-person layout blind of claim 1 wherein said first end of said foot panel has first and second spaced-apart recessed portions formed therein.

8. The multi-person layout blind of claim 1 wherein said inner surfaces of said first and second side doors have at least one handle secured thereto.

9. The multi-person layout blind of claim 1 wherein said foot panel has first and second side flaps which overlap said first and second side sheet members when said foot panel is in said closed position.

10. The multi-person layout hunting blind of claim 1 wherein said sheet members, said foot panel and said side doors have camouflaging thereon.

11. A multi-person layout hunting blind, comprising:
a frame means having a head end, a foot end, a first side, and a second side;
said frame means including a horizontally disposed base frame, an upper frame above said base frame and support members secured to and extending between said base frame and said upper frame;

said base frame including:
(a) a head frame having a first end, a second end, an inner side and an outer side;
(b) a first side frame having a head end, a foot end, an inner side and an outer side with said head end of said first side frame of said base frame being operatively connected to said first end of said head frame of said base frame;
(c) a second side frame having a head end, a foot end, an inner side and an outer side with said head end of said second side frame of said base frame being operatively connected to said second end of said head frame of said base frame;
(d) a foot frame having a first end, a second end, an inner side and an outer side with said first end of said foot frame of said base frame being operatively connected to said foot end of said first side frame of said base frame and with said second end of said foot frame of said base frame being operatively connected to said foot end of said second side frame of said base frame;

said upper frame including:
(a) a head frame having a first end, a second send, an inner side and an outer side;
(b) a first side frame having a head end, a foot end, an inner side and an outer side with said head end of said first side frame of said upper frame being operatively connected to said first end of said head frame of said upper frame;
(c) a second side frame having a head end, a foot end, an inner side and an outer side with said head end of said second side frame of said upper frame being operatively connected to said second end of said head frame of said upper frame;
(d) a foot frame having a first end, a second end, an inner side and an outer side with said first end of said foot frame of said upper frame being operatively connected to said foot end of said first side frame of said upper frame and with said second end of said foot frame of said upper frame being operatively connected to said foot end of said second side frame of said upper frame;
(e) a foot panel frame having a first end with spaced-apart legs extending therefrom;
(f) said legs of said foot panel frame being pivotally secured to said foot frame of said upper frame whereby said foot panel frame may be selectively movable between open and closed positions;
(g) said foot panel frame having inner and outer sides;
(h) a first side door frame having a first end, a second end, an inner side and an outer side;
(i) said first end of said first side door frame being pivotally secured to said first side frame of said upper frame so as to be selectively pivotally movable between open and closed positions;
(j) a second side door frame having a first end, a second end, an inner side and an outer side;
(k) said first end of said second side door frame being pivotally secured to said second side frame of said upper frame so as to be selectively pivotally movable between open and closed positions;
(l) said first and second side door frames, when in said closed positions, being positioned between said first end of said foot panel frame and said head frame of said upper frame when said foot panel frame is in said closed position;

a flexible bottom sheet member extending between said head frame, said first side frame, said second side frame and said foot frame of said base frame;

a flexible head sheet member extending between said head frames of said base frame and said upper frame at the outer sides thereof;

a flexible first side sheet member extending between said first side frames of said base frame and said upper frame at the outer sides thereof;

a flexible second side sheet member extending between said second side frames of said base frame and said upper frame at the outer sides thereof;

a flexible foot sheet member extending between said foot frames of said base frame and said upper frame at the outer sides thereof;

a flexible foot panel sheet member extending between said legs of said foot panel frame at the outer side of said foot panel frame;

a flexible first side door sheet member secured to said first side door frame at the outer side thereof which extends over said first side door frame;

a flexible second side door sheet member secured to said second side door frame at the outer side thereof which extends over said second side door frame;

said second end of said foot panel frame being spaced from said head frame of said upper frame to define a shooting opening therebetween when said foot panel frame is in said closed position and said first and second side door frames are in said open position;

said first and second side door frames closing the shooting opening when in said closed positions;

the distance between said first side frames of said base and upper frames and said second side frame of said base and upper frames being sufficient so that the blind will accommodate at least two hunters therein.

\* \* \* \* \*